Feb. 2, 1971
C. BERGER
3,560,260
METHOD OF ELIMINATING GAS PRESSURE IN BATTERIES
BY USING GAS IN FUEL CELL
Original Filed Sept. 11, 1964
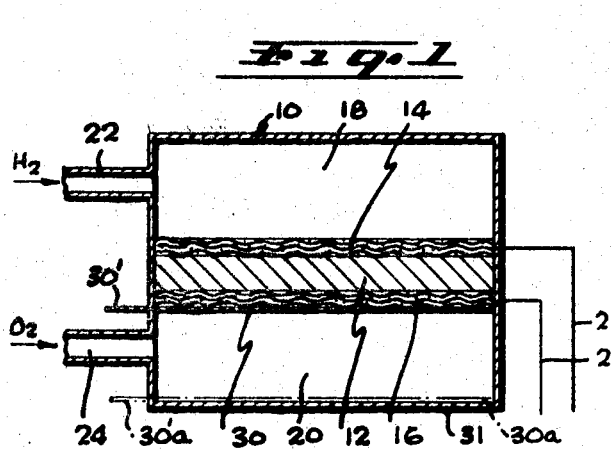
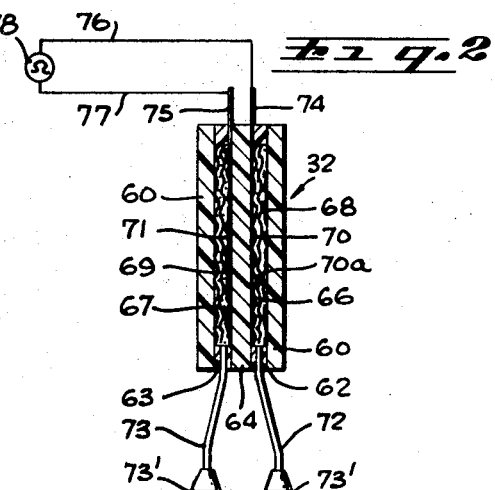
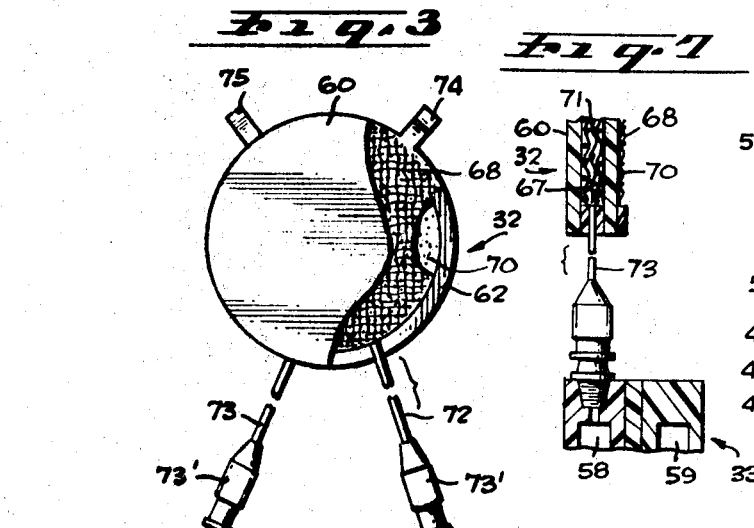
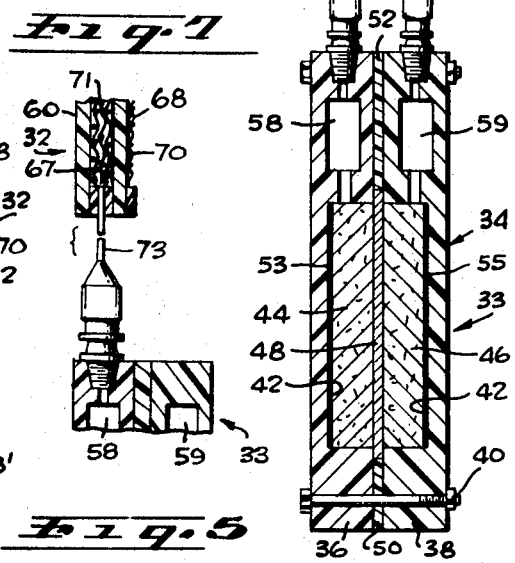
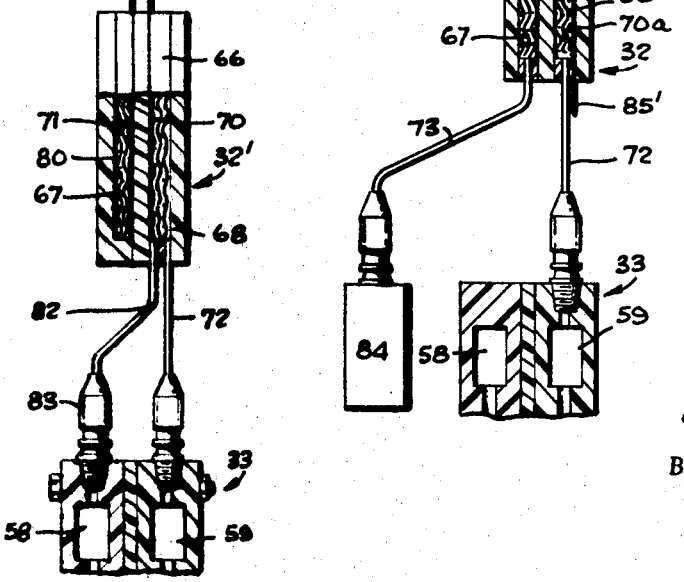
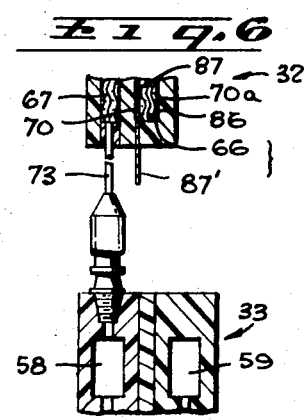
INVENTOR.
CARL BERGER
BY
ATTORNEY

United States Patent Office 3,560,260
Patented Feb. 2, 1971

3,560,260
METHOD OF ELIMINATING GAS PRESSURE IN BATTERIES BY USING GAS IN FUEL CELL
Carl Berger, Corona Del Mar, Calif., assignor, by mesne assignments, to McDonnell Douglas Corporation, Santa Monica, Calif., a corporation of Maryland
Continuation of application Ser. No. 395,681, Sept. 11, 1964. This application Jan. 24, 1969, Ser. No. 797,350
Int. Cl. H01m 1/08, 27/14, 43/00
U.S. Cl. 136—3                                           6 Claims

ABSTRACT OF THE DISCLOSURE

Combination of a fuel cell with a battery arranged with a conduit means between the battery and the fuel cell so that gas generated in the battery, e.g., hydrogen, is conducted to the fuel cell for reaction therein with another gas, e.g., oxygen, to generate an electric current and thereby eliminate gas pressure developed in the battery and also sealing the battery.

---

This application is a continuation of U.S. application Ser. No. 395,681, filed Sept. 11, 1964, now abandoned.

This invention relates to batteries, particularly high energy density batteries, and is especially concerned with a system for the elimination of dangerous pressures which are built up in such batteries during charging thereof.

Batteries are an important source of energy storage for power generation in air-borne systems. An important type of battery particularly suited for such applications are the high energy density alkaline electrolyte cells using such electrode combinations as silver-zinc, silver-carmium and nickel-cadmium. High energy density batteries are generally batteries which have a substantially higher energy per unit of weight than conventional, e.g., lead, storage batteries. In addition to important air-borne applications, such high energy density batteries have many other applications such as in portable tools and appliances, television, radio and record players, engine starting, portable X-ray units, and the like.

Most high energy density batteries of the above type generate gases during the charge cycle. If a sealed system is used, dangerous pressures can be developed and serious danger arises. Such build-up of gas pressure in batteries of the above type is a well recognized phenomenon and various methods and systems have been devised in the prior art to meet this problem. In certain prior art devices a heating element is heated as gas is generated within the battery. When the gas pressure within the battery reaches a predetermined level the element is heated to a temperature sufficient to bring about a chemical combination of the hydrogen and oxygen gases to form water. In another type of prior art apparatus a reaction chamber is provided including a quantity of catalytic material. The hydrogen and oxygen gases generated by the battery during charging are permitted to pass into the chamber where in the presence of the catalytic material they combine chemically to form water, which then drips back into the battery. In U.S. Pat. No. 2,104,973, subsidiary electrodes coated with platinum are electrically coupled to the terminals of the battery. The subsidiary electrodes function to absorb and ionize the gases escaping from the battery and provide an ion transfer path to the electrolyte of the battery. U.S. Pat. No. 2,997,516 shows a split negative electrode design for a gas type enclosed alkaline accumulator. However, all of these prior art systems for eliminating generated gases in a battery have certain disadvantages. Thus, for example, many of these systems are relatively complex and expensive and many are relatively inefficient.

It is accordingly one object of the invention to provide a system for efficiently eliminating the buildup of gas pressure during the charge cycle of a battery, particularly a high energy density battery. Another object is to provide a relatively simple device and procedure which can be employed in conjunction with any high energy density battery to eliminate gas pressures therein during charging and which simultaneously provide a means for sealing the battery.

Still another object is the provision of a simple device or means which can be hooked into the gas ports of a conventional high energy density battery, particularly a silver-zinc battery, to withdraw gases such as oxygen and/or hydrogen gases liberated during the charge cycle of the battery to thereby reduce the gas pressure in the battery, and which may also include means providing a visual or audible signal indicating such gas generation and removal thereof from the battery.

A still further object is to afford a device which can be connected to a high energy density battery during the charge cycle, particularly a silver-zinc battery, and is designed to withdraw gases, particularly hydrogen, generated during such charge cycle and to combine such hydrogen with oxygen, which may also be withdrawn from the battery during such charge cycle, to form water electrochemically, thereby reducing the battery pressure, and including means for optionally returning such formed water to the battery.

Other objects and advantages of the invention will appear hereinafter.

According to the invention concept, a miniature fuel cell, e.g., a hydrogen-oxygen fuel cell, is employed in combination with a sealed battery, preferably a high energy density battery such as a silver-zinc battery, during the charge cycle of the battery to eliminate the build-up of high pressures within the battery caused by the generation of gases such as hydrogen or oxygen generated during the charge cycle. Such miniature fuel cell is designed with conduits and with jacks which can fit into the gas ports or gas collecting chambers of the battery. In the case, for example, of a silver-zinc battery, during charging of the battery some of the generated hydrogen passes from the gas collecting port of the battery into the hydrogen chamber of the fuel cell and such hydrogen is caused to react with oxygen in the opposite chamber of the fuel cell to generate electricity. In such reaction water forms and such water can either be eliminated from the fuel cell or drawn back into the battery, thereby reducing all danger of the high pressures of the gases particularly hydrogen, built up in such batteries. As result, the gases generated by undesired side reactions during the charging of the battery are transformed into a liquid which thereby eliminates the pressure in the battery and also the system of the invention provides a device, that is a fuel cell, which in combination with the battery functions to seal the battery.

The fuel cell employed in conjunction with the high energy density battery to relieve gas pressures therein as described above, is a miniature fuel cell comprising an ion conducting material, a pair of catalyst-electrodes positioned on opposite sides of such material, a gas chamber on one side of the ion conducting material adjacent one of the electrodes and a second gas chamber on the other side of such material adjacent the other electrode. Such fuel cell can be one which employs any type of ion conducting material. Such material can be an organic or an inorganic ion exchange membrane, a capillary type material containing an electrolyte having ion conducting properties, or a liquid electrolyte. The catalyst or electrode on opposite sides of such ion conducting material can be any type of catalyst conventionally employed in fuel cells, such as, for example, platinum, which is preferably employed as a catalyst for hydrogen-oxygen fuel cells.

Where the gas generated during charging of the battery is mainly oxygen, only the oxygen chamber of the fuel cell need be connected to the oxygen collecting port of the battery, and the hydrogen chamber of the fuel cell can be a sealed chamber which contains hydrogen or to which hydrogen is supplied for reaction with the oxygen. On the other hand, where hydrogen is the gas which is mainly generated during charging of the battery then the oxygen chamber of the fuel cell may be sealed, with oxygen contained in or supplied thereto for reaction with the generated hydrogen.

According to a novel feature of the invention, where the hydrogen or oxygen chamber of the fuel cell is a sealed chamber as noted above, hydrogen generating materials or oxygen generating materials can be incorporated, respectively, in the sealed hydrogen or sealed oxygen chamber. Thus, such miniature fuel cell can be provided with a sealed hydrogen chamber containing palladium-silver alloy in a ratio of palladium to silver of about 80 to 20, or greater than 80 to 20, which alloy releases hydrogen in the chamber to furnish the hydrogen required. Other materials such as the alkali metal borohydrides, e.g., potassium, sodium or lithium borohydride, which release hydrogen in the presence of water vapor, can also be employed for this purpose. Alternatively, the miniature fuel cell can be provided with a sealed oxygen chamber containing materials such as alkali metal chlorates, e.g., sodium or potassium chlorate, or alkali metal peroxides, such as sodium or potassium peroxide, which release or generate the required oxygen.

According to another embodiment, instead of employing such sealed hydrogen or oxygen chamber containing gas generating materials, hydrogen or oxygen can be supplied to such respective chambers from an external source.

As previously noted, the catalyst electrodes of the miniature fuel cell are connected in an external circuit which is provided with a load, e.g., in the form of an electric bulb or a buzzer, so that reaction of the gases in the fuel cell, e.g., hydrogen and oxygen to form water, simultaneously generates an electric current which can light the bulb or sound the buzzer to indicate such gas generation in the battery and its elimination therefrom, or such generated current can be returned to the battery.

The invention will be more clearly understood by reference to the various embodiments thereof described below in connection with the accompanying drawing wherein:

FIG. 1 illustrates schematically a fuel cell which can be employed in the invention system;

FIG. 2 shows a cross sectional view of a miniature fuel cell in combination with a high energy density battery for reducing gas pressures therein according to the invention;

FIG. 3 is a side view partly broken away of the fuel cell shown in FIG. 2;

FIG. 4 illustrates a modified form of the system of FIG. 2 according to the invention, showing the hydrogen chamber sealed and a material incorporated therein to supply hydrogen;

FIG. 5 illustrates still another modification showing the system of FIG. 2, with one chamber of the fuel cell connected to an external gas source;

FIG. 6 illustrates another modification of the system of FIG. 2, showing the oxygen chamber sealed and a material incorporated therein to supply oxygen; and FIG. 7 shows a still further modification of the system of FIG. 2, wherein one of the electrodes of the fuel cell is open to the ambient atmosphere.

Referring to FIG. 1 of the drawing showing schematically a miniature fuel cell which can be employed in the invention system, such fuel cell comprises essentially a case 10 containing therein an ion conducting membrane 12 positioned centrally of the case and having a catalyst electrode 14 positioned in contact with one side of the membrane and a second catalyst electrode 16 positioned against the other side of the membrane. The membrane 12 accordingly divides the case 10 into two gas chambers 18 and 20 adjacent the respective catalyst electrodes 14 and 16. A conduit 22 is provided which communicates with the chamber 18 and a second conduit 24 is also provided which communicates with the chamber 20. Wires 26 and 28 are connected to the catalyst electrodes 14 and 16 respectively, for connection in an external circuit.

Thus, for example, hydrogen can be introduced into chamber 18 via the conduit 22 and oxygen can be introduced into chamber 20 through conduit 24, where, for example, such miniature fuel cell is a hydrogen-oxygen fuel cell which can be used in conjunction with a high energy density battery such as a silver-zinc, silver-cadmium, or nickel-cadmium battery to relieve hydrogen and/or oxygen gas pressures developed therein during charging, according to the invention. Thus hydrogen in chamber 18 reacts at the catalyst electrode or anode 14 and is oxidized to form hydrogen ion which migrates through the ion conducting membrane 12 and reacts with hydroxyl ion adjacent the catalyst electrode or cathode 16, which hydroxyl ion is formed by reduction of the oxygen in chamber 20 at such catalyst electrode or cathode, forming water. The water thus formed adjacent the catalyst electrode 16 in chamber 20 is preferably eliminated from the fuel cell to avoid drowning of the electrode 16, e.g., by the provision of a wicking element indicated at 30 and placed essentially in contact with the electrode catalyst 16, and extending exteriorly of the cell. Such wicking element can be any porous material permitting passage of gas therethrough, and capable of absorbing water and transmitting it by capillary action to the external atmosphere. Such wicking materials can include, for example, porous sheets or tufting formed from orlon, dacron, glass wool, cellulose acetate, and the like. Thus, water formed adjacent electrode 16 is absorbed by member 30 and is drawn by capillary action to the outer portion of the membrane 30, located externally of the fuel cell as indicated at 30'.

Alternatively, a wicking element indicated by dotted lines 30a can be employed and placed against the wall 31 of the fuel cell chamber 20 opposite the cathode 16, and extending exteriorly of the cell, as indicated at 30'a. In this modification, the water vapor formed in chamber 20 condenses against the outer wall 31 in the chamber and such water is drawn into wicking element 30a and by capillary action is withdrawn to the atmosphere via the externally located portion 30'a of such element.

Referring now to FIG. 2 there is shown a fuel cell 32 according to the invention, employed in combination with a silver-zinc high energy density battery 33. The battery 33 is composed of a plastic case 34 formed as two symmetrical, e.g., Teflon, half portions 36 and 38 which are bolted together as indicated at 40. Compartments 36 and 38 of the case have recesses 42 formed therein to receive the zinc and silver electrodes 44 and 46 respectively. An inorganic separator 48, e.g., composed of aluminosilicate, is disposed essentially between the case portions 36 and 38 so that the electrodes 44 and 46 are disposed against opposite surfaces of such separator. Teflon spacers 50 and 52 are provided about the periphery of separator 48 to form a leak proof seal. Nickel screens 53 and 55 are placed against electrodes 44 and 46 to provide connections for electrical terminal wires (not shown) connected to such screens. Compartments 58 and 59 are provided in the upper portion of the respective electrode compartments 36 and 38, which are in communication with the zinc and silver electrodes 44 and 46 respectively, and form gas collecting compartments or ports above such electrodes.

The fuel cell 32 employed in combination with the battery 33, and shown in FIGS. 2 and 3, comprises a pair of fiber-glass back plates 60 which when assembled hold together a pair of adjacent neoprene gaskets 62 and 63 with a central membrane 64 sandwiched between the gaskets 62 and 63. In this embodiment the ion conducting membrane 64 is an organic cation exchanger crosslinked polystyrene plastic in a polypropylene or polyethylene medium. The assembly of members 60, 62, 63 and 64 can be accomplished by use of any suitable adhesive or glue.

The central portion of the ion conducting membrane 64 is covered or coated with a platinum black catalyst on both sides of the membrane, indicated at 70 and 71. Prior to assembly of members 60, 62, 63 aud 64, platinized screens 68 and 69 are placed in the center of gaskets 62 and 63, respectively. Following assembly of the above-noted parts it will be seen that enclosed chambers 66 and 67 are formed on opposite sides of the ion conducting membrane 64, chamber 66 containing the screen 68 and the catalyst electrode 70, and chamber 67 containing screen 69 and the catalyst electrode 71. The screens 68 and 69 are of a corrugated or mesh material such that when the unit is assembled the respective back plates 60 force the screens 68 and 69 into contact with their respective catalyst electrodes 70 and 71.

The fuel cell 32 is provided with a first conduit 72 which passes through gasket 62 and communicates with chamber 66, and a second conduit 73 which passes through the gasket 63 and communicates with the opposite gas chamber 67. Conduits 72 and 73 are connected respectively by means of jacks 73' to the gas compartments 59 and 58, respectively, of the battery 33. Terminals 74 and 75 are connected respectively to the platinized screens 68 and 69, such terminals extending exteriorly of the fuel cell. Terminals 74 and 75 are connected in an external circuit including the electrical wires 76 and 77 and a load indicated at 78 in the form of an electric bulb.

In the embodiment shown in FIG. 2, during charging of battery 33 oxygen gas is generated at the silver anode 42 and collects in the compartment 59, and hydrogen is generated at the zinc cathode 44 and collects in the compartment 58. The oxygen so collected is passed via the conduit 72 into the oxygen chamber 66 of the fuel cell and the hydrogen so collected is conducted via the conduit 73 into the hydrogen chamber 67 of the fuel cell. Hydrogen ion formed at the catalyst electrode 71 passes through the membrane 64 and unites with hydroxyl ion formed by contact of oxygen in chamber 66 with the catalyst electrode 70 to produce water adjacent the electrode 70, in a manner well known in the art, which drips into the bottom of the compartment 66 and such water can return to the battery via the conduit 72. The current thus generated in the fuel cell flows through the external circuit including wires 76 and 77 and the electric bulb 78, causing the bulb to glow and give a visual signal of the generation of gases in the battery and the elimination thereof in the fuel cell.

Preferably, the water formed in chamber 66 is returned to the battery via a separate return path, e.g., as described in the embodiment of FIG. 4 below, and shown at 82 therein. Alternatively, a porous wicking element such as 30 or 30a, can be incorporated against the catalyst electrode 70 of oxygen chamber 66, or adjacent the opposite wall 70a of such chamber, such element extending externally of the chamber 66, in the manner illustrated in FIG. 1, for removal of water formed in said chamber.

Where substantially only hydrogen is given off during charging of the battery 33, line 72 can function essentially as the water return path to the battery, substantially without any interference from any oxygen gas passing through conduit 72.

In the modification of FIG. 4 the fuel cell 32' is substantially of the same construction as the fuel cell 32 in FIGS. 2 and 3, except that in the fuel cell of FIG. 4 the hydrogen chamber 67 is sealed and the chamber 67 is provided along one wall thereof opposite membrane 64, with a coating 80 of palladium-silver alloy. Also, a return conduit 82 is provided communicating with the oxygen chamber 66 at a point closely adjacent to the catalyst electrode 70 thereof and connected at its lower end by means of a jack 83 with the compartment 58 of the battery 33. In the operation of the modification of FIG. 4, sufficient hydrogen is released from the palladium-silver 80 in the hydrogen chamber 67 to react with the oxygen in chamber 66, which is conducted thereto from the oxygen collecting compartment 59 of the battery, as above described, to form water which collects at the bottom of chamber 66 adjacent to the catalyst electrode 70 and drains therefrom via conduit 82 back to compartment 58 of the battery.

In the modification shown in FIG. 5 the fuel cell 32 and the battery 33 are of substantially the same construction as the fuel cell shown in FIGS. 2 and 3, except that in this modified form the conduit 73 which communicates with the hydrogen chamber 67 is connected to an outside source of hydrogen, as indicated at 84, to supply the necessary hydrogen to the chamber 67 for reaction with the oxygen in chamber 66, which is conducted thereto from the gas collecting compartment 59 of battery 33 during the charging cycle thereof. The modification of FIG. 5 operates in substantially the same manner as the modification of FIGS. 2 and 3 except that during the charging cycle of the battery 33 in FIG. 5, substantially only oxygen is produced, requiring connection of the hydrogen chamber to the external source. A wicking element 85' of the type described above is provided against wall 70a of the oxygen chamber and extending exteriorly of the chamber as shown at 85', to remove water formed in such chamber.

In the modified forms of FIGS. 4 and 5, if during charging of the battery 33 the gas generated is substantially only hydrogen, the conduit 72 connecting the oxygen chamber 66 with the gas compartment 59 of the battery would be omitted, and instead a conduit such as 73 in FIG. 2 would be employed, connecting the hydrogen chamber 67 with the compartment 58 of the battery. Under these circumstances oxygen would be required to be supplied to the oxygen chamber 66 for reaction with the generated hydrogen for operation of the fuel cell, and such oxygen could be supplied, for example, from an external source similar to the manner that hydrogen is supplied from an external source to the hydrogen chamber 67 in the modification of FIG. 5.

In FIG. 6 is shown a modification wherein the battery generates essentially only hydrogen during charging. Here conduit 73 connects the hydrogen chamber 67 of the fuel cell with the gas compartment 58 of the battery, and a coating 86 of an oxygen generating material, e.g., potassium chlorate, is provided on wall 70a of the oxygen compartment 66 of the fuel cell, to supply the necessary oxygen. A wicking element 87' is provided against the catalyst electrode 70 to remove water to the external portion 87' of such element and to the ambient atmosphere.

Although the invention principles have been described above principally with respect to a hydrogen-oxygen fuel cell for use in conjunction with high energy density batteries such as the above-noted silver-zinc, silver-cadmium, and nickel-cadmium batteries, it will be understood that the principles of the invention are equally applicable to fuel cells which operate on other gas systems such as, for example, chlorine-hydrogen, and oxygen-hydrocarbon, e.g., oxygen-methane fuel cells.

As previously noted, the ion conducting material of the fuel cell can be any of the known types of materials employed for this purpose. Thus, such materials can be a membrane composed of an organic ion conducting material such as the polystyrene type ion exchanger membrane described above in connection with the systems shown in FIGS. 2 and 3 of the drawing. In addition, ion conducting membranes in the form of inorganic ion exchange membranes such as hydrous oxides of zirconium, titanium or bismuth, and zirconium phosphates can be employed, and membranes composed of capillary type materials containing an electrolyte which has ion conducting properties, such as KOH-asbestos and $H_3PO_4^-$ asbestos membranes, can be utilized. Further, liquid systems such as alkaline, e.g., potassium hydroxide, or acid, e.g., sulfuric acid or phosphoric acid, can be employed as electrolyte or ion conducting material. Hence the term "ion conducting material" as employed in the specification and claims is intended to denote any of the materials noted above including such solid ion conducting membranes and liquid electrolytes.

The electrode catalyst positioned on opposite sides of the fuel cell membrane can be composed of any conventional catalyst material for this purpose. Such catalyst materials include platinum, iridium, nickel-nickel oxide in a strong alkaline environment, and the like.

Voltages generated by the fuel cell generally range from about 0.5 to about 1 volt, with current densities ranging from about 0.5 to about 50 milliamps per square centimeter depending on the particular type of fuel cell.

As previously noted, high energy density batteries to which the invention principles are particularly applicable include silver-zinc, silver-cadmium and nickel-cadmium batteries. The membranes or separators disposed between the electrodes of opposite polarity employed in such batteries can be porous inorganic, or porous organic separators. These include inorganic separators in the form of insoluble hydrous metal oxides, e.g., hydrous zirconium oxide or the other hydrous oxides, e.g., of titanium, antimony, tungsten, bismuth, and the like described in copending application, Ser. No. 379,093 of Carl Berger et al., filed June 30, 1964, now Pat. No. 3,489,610, or in the form of sintered ceramics such as the sintered aluminosilicates, and also the sintered alumina or sintered silica, as described in the copending application Ser. No. 378,857 of Carl Berger and Frank C. Arrance, filed June 29, 1964, now Pat. No. 3,318,353.

Organic separators which can be employed in such bateeries include microporous plastic such as nylon, Dynel, Teflon, sausage casing (felted regenerated cellulose), and the like.

The battery separator function to retain electrolyte, to separate the electrodes and also to permit ionic transfer but preventing transfer of electrode ions.

The system shown in FIG. 2 was employed during the charging cycle of a silver-zinc battery of the type illustrated in FIG. 2. When hydrogen and oxygen were applied to the cell from the battery, the voltage rose to 0.9 volt, and the current was adjusted by use of the variable resistor to 5 milliamps. After a few minutes operation the voltage dropped to about 0.82 volt and remained constant for about 10 minutes. Then it began to gradually fall off. This cell was shut off after about one-half hour operation, at which time the voltage had dropped to about 0.73 volt.

The same minature fuel cell as shown in FIG. 2 was fabricated except that a very fine spray of Teflon was applied to the opposite platinized surface of the membrane 64 prior to assembly of this cell. This was done so as to waterproof the electrode structure and aid in preventing electrode flooding. After one hour of operation the cell voltage was holding constant at about 0.87 volt and five milliamps current.

In FIG. 7 is shown another modification of the invention, which is similar to that illustrated in FIG. 6, except that in FIG. 7 one of the back plates 60 adjacent the catalyst electrode 70 has been removed and such catalyst electrode is now open to the ambient atmosphere, and also wicking element 87 has been omitted. In this embodiment hydrogen generated by the battery passes into the hydrogen chamber 67 for reaction at the catalyst electrode 71, and the oxygen required to react at catalyst electrode 70 is supplied by the oxygen present in the ambient atmosphere to which the electrode 70 is exposed, and preferably by sweeping air across the exposed electrode 70. The wicking member 87 of FIG. 6 is not necessary in this modification since the air present over the exposed electrode 70 will generally evaporate the water formed at such electrode.

From the foregoing, it is seen that the invention provides a novel system for eliminating gas pressures, particularly hydrogen and oxygen gas pressures, generated during the charging of high energy density batteries such as the silver-zinc battery. This is accomplished by the simple connection of minature fuel cell to the battery so as to conduct generated gas from the battery, such as oxygen and/or hydrogen, and causing such gases to react in the fuel cell to generate an electric current which can be employed to operate a signalling device such as an audio or a visual signal. Alternatively, if the low currents generated in the fuel cell are of the same order of magnitude as the current output of the battery, such current can be fed back to the battery at its terminals, thereby improving the performance of the battery. The invention system not only eliminates dangerous gas pressures generated in the above batteries during the charge cycle, but seals the battery during such charge cycle. Further, if desired, water formed in the fuel cell can be returned to the battery.

Although in preferred practice as described above, the gas collecting port or ports of the battery are connected to one or both chambers of the fuel cell by a conduit means, it will be understood that the principles of the invention can be achieved by employing any suitable means for placing or conducting the gas generated in the battery into operative association with the fuel cell, and specifically with the respective electrodes thereof.

It will be understood that various modifications and adaptations of the invention can be made by those skilled in the art without departing from the spirit of the invention, and accordingly the invention is not to be taken as limited except by the scope of the appended claims.

I claim:

1. In a sealed, rechargeable secondary high energy density storage battery having an electrolyte and a pair of electrodes, one of said pair being selected from the group consisting of silver and nickel and the other of said pair being selected from the group consisting of zinc and cadmium, the method of relieving pressure during charging comprising charging said high energy density battery to generate at least one gas, the improvement comprising removing said gas from said high energy density battery to relieve the pressure therein and feeding said gas into a fuel cell disposed externally of said high energy density storage battery wherein said gas functions as the oxidant and/or fuel, thereby producing electrical energy.

2. The method of claim 1 wherein said pair of electrodes are silver and zinc electrodes.

3. The method of claim 1 wherein said high energy density battery generates hydrogen and/or oxygen during charging, and said fuel cell is a hydrogen-oxygen fuel cell.

4. The method of claim 1 wherein said battery includes at least one gas collecting zone communicating with at least one of said electrodes.

5. The method of claim 1 wherein at least two gases are generated during charging and are reacted togeher in said fuel cell.

6. The method of claim 1 wherein said gas generated during charging is reacted in said fuel cell with a different gas supplied to said fuel cell from a source outside said battery.

(References on following page)

References Cited

UNITED STATES PATENTS

| | | | |
|---|---|---|---|
| 496,126 | 4/1893 | La Roche | 136—86 |
| 885,054 | 4/1908 | Jungner | 136—86 |
| 2,857,447 | 10/1958 | Lindstrom | 136—179UX |
| 3,057,942 | 10/1942 | Smith et al. | 136—179UX |
| 3,080,440 | 3/1963 | Ruetschi et al. | 136—179UX |
| 3,364,077 | 1/1968 | Avrance et al. | 136—146 |
| 2,913,511 | 11/1959 | Grubb | 136—86 |
| 2,925,455 | 2/1960 | Eidensohn et al. | 136—86 |
| 2,951,106 | 8/1960 | Ruetschi | 136—179X |
| 3,172,784 | 3/1965 | Blackmer | 136—86 |
| 3,250,646 | 5/1966 | Hipp | 136—86X |
| 3,260,620 | 7/1966 | Gruber | 136—86 |
| 3,264,139 | 8/1966 | Solomon et al. | 136—6X |
| 3,338,746 | 8/1967 | Plust et al. | 136—86 |
| 3,256,116 | 6/1966 | Justi et al. | 136—86 |
| 3,152,015 | 10/1964 | Turrell | 136—86 |
| 3,080,442 | 3/1963 | Hobert | 136—86 |
| 2,980,749 | 4/1961 | Braers | 136—86 |
| 2,070,612 | 2/1937 | Niederreither | 136—86 |

FOREIGN PATENTS

| | | | |
|---|---|---|---|
| 746 | 1889 | Great Britain | 136—179.3 |
| 667,298 | 2/1952 | Great Britain | 136—86 |
| 1,051,820 | 5/1959 | Germany | 204—1.07 |
| 5,198 | 1881 | Great Britain | 136—86.5 |
| 303,799 | 4/1930 | Great Britain | 136—179.5 |
| 183,708 | 5/1963 | Sweden | 136—86 |

OTHER REFERENCES

Benjamin, Gas Cells, in "The Voltaic Cell," 1st edition, 1893, pp. 327–329.

ALLEN B. CURTIS, Primary Examiner

U.S. Cl. X.R.

136—86